(12) United States Patent
Rabadzijev et al.

(10) Patent No.: US 11,561,090 B2
(45) Date of Patent: Jan. 24, 2023

(54) CONTACT MONITORING ON A SPINDLE OF A MACHINE TOOL

(71) Applicant: REISHAUER AG, Wallisellen (CH)

(72) Inventors: Daniel Cölestin Dimitri Rabadzijev, Opfikon (CH); Thomas Keller, Gossau (CH)

(73) Assignee: REISHAUER AG, Wallisellen (CH)

( * ) Notice: Subject to any disclaimer, the term of this patent is extended or adjusted under 35 U.S.C. 154(b) by 172 days.

(21) Appl. No.: 16/957,174

(22) PCT Filed: Feb. 5, 2019

(86) PCT No.: PCT/EP2019/052773
§ 371 (c)(1),
(2) Date: Jun. 23, 2020

(87) PCT Pub. No.: WO2019/166193
PCT Pub. Date: Sep. 6, 2019

(65) Prior Publication Data
US 2020/0318956 A1 Oct. 8, 2020

(30) Foreign Application Priority Data
Feb. 27, 2018 (CH) .................................. 00235/18

(51) Int. Cl.
*G01B 13/12* (2006.01)
*B23Q 17/00* (2006.01)
(Continued)

(52) U.S. Cl.
CPC ............ *G01B 13/12* (2013.01); *B23Q 17/003* (2013.01); *B23Q 17/005* (2013.01); *G01L 7/00* (2013.01);
(Continued)

(58) Field of Classification Search
CPC .... B23Q 14/00; B23Q 17/003; B23Q 17/005; B23Q 17/002; B23Q 2716/00;
(Continued)

(56) References Cited

U.S. PATENT DOCUMENTS 4,977,777 A * 12/1990 Bieg ...................... G01B 13/16
73/37.5
5,481,482 A * 1/1996 Nagai ................. G05D 16/2026
700/301
(Continued)

FOREIGN PATENT DOCUMENTS

DE  100 17 556 A1  10/2001
DE  101 55 135 A1   5/2003
(Continued)

OTHER PUBLICATIONS

International Search Report of PCT/EP2019/052773 dated Apr. 16, 2019.
(Continued)

*Primary Examiner* — Lee D Wilson
*Assistant Examiner* — Jason Khalil Hawkins
(74) *Attorney, Agent, or Firm* — Sughrue Mion, PLLC

(57) ABSTRACT

The invention relates to a device for monitoring the contact of a workpiece (1) or tool on a spindle (2) of a machine tool, which device has a contact surface (3) for the workpiece (1) or tool. At least one measurement nozzle (4) is arranged in the region of the contact surface in order to produce a fluid flow directed away from the contact surface (3). Upstream of the measurement nozzle, the fluid flow is conducted through a vacuum nozzle, which can comprise a jet nozzle (7c) and a collector nozzle (7b). When the fluid medium flows through the vacuum nozzle, the vacuum nozzle produces a negative pressure in a negative pressure chamber (9c). A pressure sensor (6) or pressure switch senses a
(Continued)

measurement pressure (p3) in the negative pressure chamber.

28 Claims, 5 Drawing Sheets

(51) Int. Cl.
    *G01L 21/00*     (2006.01)
    *G01L 7/00*     (2006.01)
    *G01L 19/14*     (2006.01)
    *G01L 19/00*     (2006.01)

(52) U.S. Cl.
    CPC .......... *G01L 21/00* (2013.01); *B23Q 2716/00* (2013.01); *B23Q 2717/00* (2013.01); *G01B 2210/58* (2013.01); *G01L 19/14* (2013.01); *G01L 2019/0053* (2013.01)

(58) Field of Classification Search
    CPC ....... B23Q 2717/00; B01B 13/12; G01F 1/28; G01L 21/00; G01L 19/0015; G01L 19/14; G01L 7/00; G01L 2019/0053; G01B 13/12; G01B 2210/58
    USPC .................. 73/700, 861.63, 704, 714; 33/701
    See application file for complete search history.

(56) References Cited

U.S. PATENT DOCUMENTS

| | | | | |
|---|---|---|---|---|
| 5,540,082 | A * | 7/1996 | Okuyama | B23Q 17/003 340/815.45 |
| 6,647,808 | B2 * | 11/2003 | Sato | B23Q 17/002 73/861.63 |
| 6,901,797 | B2 * | 6/2005 | Hyatt | G01B 13/10 33/544.5 |
| 7,441,460 | B2 * | 10/2008 | Krupa | G01L 19/083 73/753 |
| 9,358,696 | B2 * | 6/2016 | Lyons | G02B 1/04 |
| 2002/0178838 | A1 | 12/2002 | Sato et al. | |
| 2007/0074579 | A1 * | 4/2007 | Cook | G01L 9/0072 73/718 |

FOREIGN PATENT DOCUMENTS

| | | |
|---|---|---|
| DE | 102 39 079 A1 | 3/2004 |
| DE | 10 2005 002 448 A1 | 7/2006 |
| DE | 10 2012 216 073 A1 | 3/2014 |
| DE | 10 2014 112 116 A1 | 2/2016 |
| EP | 0 794 035 A1 | 9/1997 |
| EP | 1 393 854 A1 | 3/2004 |
| EP | 1 537 946 A1 | 6/2005 |
| EP | 3 085 490 A2 | 10/2016 |
| JP | 5-60709 U | 8/1993 |
| JP | 6-75642 U | 10/1994 |
| JP | 2014-92503 A | 5/2014 |
| JP | 2016-135533 A | 7/2016 |
| WO | 2012/160204 A1 | 11/2012 |
| WO | 2015/036519 A1 | 3/2015 |

OTHER PUBLICATIONS

Office Action dated Sep. 13, 2022 in Japanese Application No. 2020-544775.

* cited by examiner

CONTACT MONITORING ON A SPINDLE OF A MACHINE TOOL

CROSS REFERENCE TO RELATED APPLICATIONS

This application is a National Stage of International Application No. PCT/EP2019/052773 filed Feb. 5, 2019, claiming priority based on Swiss Patent Application No. 00235/18 filed Feb. 27, 2018.

TECHNICAL FIELD

10 The present invention relates to a device for monitoring contact on a spindle of a machine tool as well as a corresponding method for the determination of the presence and position of a workpiece or tool.

PRIOR ART

Devices for monitoring contact are used on machine tools in order to determine the presence and position of a workpiece on a clamping device.

From the prior art, in particular devices for monitoring contact are known which are based on the principle of pneumatic length measurement. This principle of measurement is extensively described in standard DIN 2271 (12.2016). An important class of pneumatic devices for monitoring contact is based on the principle of dynamic pressure measurement. A fluid is guided to a measuring nozzle. When a workpiece covers the outlet of the measuring nozzle, the dynamic pressure (stagnation pressure) in the measuring nozzle changes. This change is measured. Pneumatic devices for monitoring contact based on this principle of measurement are commercially available from various manufacturers. Typical measuring distances are 0.02 to 0.2 mm.

Examples for pneumatic devices for monitoring contact can also be found in the patent 30 literature. For instance, DE 10 2005 002 448 A1 discloses a monitoring device for monitoring the position of a workpiece in front of a discharge opening of the monitoring device, wherein a fluid source feeds pressurized air with a bias pressure to the discharge opening via an orifice element. A differential pressure sensor measures the pressure drop across the orifice element, i.e. the pressure difference between the bias pressure supplied by the source and the dynamic pressure reached at the discharge opening. Changes of this pressure difference are used to determine the position.

Further examples for pneumatic devices for monitoring contact are disclosed in DE 102 39 079 A1, DE 101 55 135 A1, EP 1 537 946 A1, EP 0 794 035 A1, U.S. Pat. No. 5,540,082, DE 10 2012 216 073 A1 and WO 2012/160204 A1.

In the prior art, also other principles of measurement for monitoring contact are suggested. Thus, EP 3 085 490 A2 discloses a device for monitoring contact which uses ultrasound measurements. DE 10 2014 112 116 A1 discloses a device for monitoring contact which uses a microwave resonator as a sensor.

Precise monitoring of contact is especially important in gear processing machines. The transport of the workpiece mostly is carried out by frictional engagement with the clamping device, while the workpiece lies with a planar surface on a planar counter surface of the clamping device. Small chips, abrasive slurry and other contaminations can impede a planar parallel support of the workpiece on the counter surface, causing the workpiece to be clamped in a skew manner. This, on the one hand, worsens the machining accuracy and leads to more rejects. On the other hand, skew clamping of the workpiece can also cause reduced frictional engagement, so that under certain circumstances it is not any more ensured that the workpiece is securely taken along. It is also important to recognize workpieces whose planar surface has been processed in a faulty manner or has been damaged. This leads to very high requirements of accuracy of the device for monitoring contact. Even tilts of a few micrometers should be detectable. Existing devices for monitoring contact often exhibit an insufficient accuracy for this purpose. High accuracy is also important in the monitoring of contact of a tool.

In gear processing machines, workpiece changes are usually carried out in an automated manner within a few seconds. The monitoring of contact therefore must be carried out very fast, in a fraction of the time for workpiece change. In order to achieve short measurement times, it is desired to arrange the device for monitoring contact directly on the rotatable spindle. However, existing devices for monitoring contact are often not suitable for this purpose.

DE 100 17 556 A1 discloses a device for setting a vacuum produced in a Venturi nozzle. For this purpose, a baffle plate is arranged in the discharge region of the fluid behind the Venturi nozzle. The baffle plate is axially displaceable by an adjusting unit. By the linear displacement of the baffle plate by the aid of the adjusting unit, the vacuum produced by the Venturi nozzle can be changed in a specific manner. This document is not concerned with the monitoring of contact; instead, it is concerned with the precise production of an adjustable vacuum.

SUMMARY OF THE INVENTION

It is an object of the present invention to provide a device for monitoring contact of a workpiece or tool in a machine tool, which enables high accuracy and is yet compact and can be realized in a cost-effective manner.

Thus, a device for monitoring contact of a workpiece or tool on a spindle of a machine tool, in particular of a gear processing machine, by means of a fluid medium, is suggested.

The device comprises:
a support surface for the workpiece or the tool;
at least one measuring nozzle, which is arranged in a region of the support surface, in order to produce a fluid flow directed away from the support surface;
a vacuum nozzle arranged upstream of the measuring nozzle, which is configured to produce a vacuum in a vacuum space by a flow of a fluid medium through the vacuum nozzle; and
at least one first pressure sensor or pressure switch which is configured to measure a measurement pressure in the vacuum space.

The pressure sensor or pressure switch is thus configured and arranged such that it measures the measurement pressure in the vacuum space. In the suggested device, the measuring range. i.e. the span within which the measurement pressure can maximally change due to the presence or absence of the workpiece or tool, respectively, is strongly enlarged compared to known devices. When the measuring nozzle is completely closed, the measuring pressure substantially corresponds to the (positive) feed pressure which is fed into the vacuum nozzle. When the measuring nozzle however is completely open, the measurement pressure can reach substantial negative values. The maximum change of the measurement pressure is thus larger than the feed pressure in terms of magnitude. In contrast, in known devices, always only pressure values with the same algebraic sign are produced. The maximum change of pressure which can thereby be recorded is always only a fraction of the feed pressure.

Due to the significantly enlarged measuring range of the device according to the present invention, already small changes in the distance between the support surface and the tool or the workpiece, respectively, lead to relatively large changes of the measurement pressure. Thereby, also very small distances can be detected in a precise and reproducible manner. The present invention thus provides a pneumatic signal amplification in order to increase the accuracy and reproducibility of the monitoring of contact or of the measurement of distance.

The term "monitoring of contact" is to be understood in the present context as a method for the determination of the position of the workpiece or tool, respectively, relative to the support surface. The result of this method can for example be a continuous measured value (e.g. a distance value) or a binary value (e.g. "sufficient contact" vs. "insufficient contact").

The term "vacuum nozzle" is to be understood in the present context as a device which comprises a fluid inlet and a fluid outlet, wherein a fluid flow which enters the device through the fluid inlet is guided through a constriction on its way to the fluid outlet, so that it is accelerated. This results in a vacuum in the region of the constriction and/or downstream of the constriction. This vacuum is measured. For this purpose, the vacuum nozzle can comprise a vacuum port, and a separate vacuum space can be connected to the vacuum port, the first pressure sensor being arranged on the vacuum space. The vacuum space, however, can also be an integral part of the vacuum nozzle, and the first pressure sensor can insofar also be arranged directly on the vacuum nozzle without the need for a separate vacuum port.

The vacuum space preferably has no further connection to the environment. Therefore, it also cannot aspirate any ambient air containing impurities. The device therefore can be operated in particular with oil-free or with oil-containing pressurized air.

A vacuum nozzle can in particular be formed as a simple Venturi nozzle or as a Laval nozzle. However, also more complex designs are possible, especially two- or multi-stage designs. In particular, the vacuum nozzle can comprise a jet nozzle with a constriction that accelerates the fluid flow. Downstream of the jet nozzle, a separate collector nozzle can be arranged, which slowly widens again in order to slow down the fluid flow again. The vacuum space can then be formed as a chamber between the jet nozzle and the collector nozzle, or it can communicate with an area between the jet nozzle and the collector nozzle. It is possible for a fluid flow to be accelerated to supersonic speed in the vacuum nozzle. In this manner, a vacuum up to e.g. about −0.9 bar compared to the ambient pressure can be reached.

Vacuum nozzles sometimes are termed vacuum suction nozzles or vacuum ejectors. Vacuum nozzles are available at low cost in various embodiments.

The term "pressure sensor" is to be understood in the present context as any device which converts the measurement value "pressure" into an analog or digital electric signal. There are different measuring principles for pressure sensors. A known measuring principle for example uses e.g. a strain gauge which is arranged on a stretchable membrane. Pressure differences result in a deformation of the membrane. This deformation is detected by the strain gauge. A different measuring principle uses the piezoelectric effect. The person skilled in the art knows a plurality of various pressure sensors, and the present invention is not limited to a specific kind of pressure sensor. The pressure sensor can in particular be an absolute pressure sensor, or it can be a differential pressure sensor, which determines the measurement pressure relative to some reference pressure. The reference pressure can e.g. be the ambient pressure or the feed pressure at the inlet of the vacuum nozzle.

A "pressure switch" is to be understood in the present context as a device which opens or closes a contact depending on the pressure.

In the present context, all pressure values are in relation to the ambient pressure. i.e. pressure values which are smaller than the ambient pressure receive a negative algebraic sign. This definition is used in the present context independent of the manner by which the pressure values have been determined.

The term "measuring nozzle" is to be understood in a broad sense in the present context. The measuring nozzle can have any shape. It comprises an opening which results in the fluid flow running away from the support surface when it is discharged from the measuring nozzle. Preferably, the fluid flow exits the measuring nozzle perpendicular to the support surface.

In order to be able to determine pressure values covering the entire measuring range, the first pressure sensor is advantageously arranged in order to detect positive as well as negative values of the measurement pressure in the vacuum space. In order to effectively use the entire measuring range, the device preferably is dimensioned in a manner that the measurement pressure in the vacuum space in the absence of a workpiece or tool on the support surface actually reaches a negative value when the device is operated in the intended manner, i.e. when the fluid is fed to the vacuum nozzle with the intended feed pressure. In particular, the dimensions of the measuring nozzle and of the conduits between the vacuum nozzle and the measuring nozzle as well as the construction of the vacuum nozzle are coordinated in a suitable manner. The intended feed pressure therein lies preferably below 2 bar, in particular preferably in the range of 0.8 bar to 1.6 bar.

The device for monitoring contact can comprise a pressure regulator, in order to produce a predetermined feed pressure upstream of the vacuum nozzle. Alternatively or in addition, the device for monitoring contact can comprise a second pressure sensor, in order to determine the feed pressure upstream of the vacuum nozzle.

The device can furthermore comprise a controller. The controller is then configured to receive a signal from the first pressure sensor or pressure switch, the signal depending on the measurement pressure, and to determine a position of the workpiece or tool under consideration of the received signal. The signal can in particular be a measuring signal that essentially continuously depends on the measurement pressure; however, it also can be a simple binary signal which signals that a certain pressure threshold has been undershot or exceeded.

The controller can furthermore be configured to take into account the feed pressure upstream of the vacuum nozzle when determining the position of the workpiece or tool. For this purpose, the controller can receive signals from said second pressure sensor. However, it is also conceivable that the feed pressure is fixed by a pressure regulator and the corresponding pressure value is supplied to the controller in a different manner than by a pressure sensor.

The measuring nozzle can be arranged in the region of the support surface such that a workpiece or tool completely closes the measuring nozzle in case of a precisely plane-parallel abutment on the support surface. In case of a plane-parallel abutment, the measurement pressure thus corresponds substantially to the feed pressure. In this manner, the entire measuring range is used.

Alternatively or in addition, the measuring nozzle however can also be arranged in the region of the support surface such that a workpiece or tool is arranged at a defined distance from the measuring nozzle in case of a precisely plane-parallel abutment on the support surface, such that the workpiece or tool does not completely close the measuring nozzle. Even in case of a precisely plane-parallel abutment, a certain amount of fluid will then flow through the vacuum nozzle, and as a result, the measurement pressure will be smaller than the feed pressure even in case of a precisely planar parallel abutment. In this manner, not the entire measuring range is used. However, in return, the device can e.g. be operated in a range in which the device is maximally sensitive to changes in distance, i.e. in a range in which the characteristic curve describing the dependency of the pressure on the distance is the steepest.

The vacuum nozzle and the measuring nozzle can be formed in a very compact manner. Thereby, they can be arranged on a rotatable part of the spindle. The measuring line (tubing) between the vacuum nozzle and the measuring nozzle can thereby be configured to be very short. This improves the response of the device and facilitates short measuring times.

The device can in particular comprise a compact functional unit, which comprises a housing in which at least the vacuum nozzle is arranged. Optionally, the measuring nozzle can also be part of the functional unit. The functional unit can form a cartridge which is arranged in a bore of a rotatable part of the spindle, in particular inserted against the flow direction into such a bore, e.g. slid in or screwed in. The bore in this case preferably runs parallel to the spindle axis.

In order to facilitate signal transmission to the controller, the first pressure sensor or pressure switch and/or the second pressure sensor can comprise a device for wireless signal transmission, in particular, a passive RFID transponder.

In order to facilitate the cleaning of the device, the device can comprise an additional pressure port in order to purge at least the vacuum nozzle and the measuring nozzle. In order to prevent that the pressurized air exits the device again through the fluid inlet, a non-return valve can be arranged at the fluid inlet, which closes when the pressure on the additional pressure port exceeds the feed pressure at the fluid inlet. Similarly, a non-return valve can be arranged on the additional pressure port, which prevents the fluid from being discharged through the additional pressure port during normal operation.

The device can comprise at least one further vacuum nozzle, and the device can be configured to carry out one of the following tasks using the additional vacuum nozzle:
measuring a distance between two machine elements;
measuring a dynamic pressure;
measuring a flow rate;
regulating the flow rate;
regulating a pressure.

The invention furthermore provides a method for monitoring contact of a workpiece or tool on a spindle of a machine tool, especially of a gear processing machine, by means of a fluid medium. The spindle comprises a support surface for the workpiece or tool. The method comprises:

generating a fluid flow directed away from the support surface through at least one measuring nozzle, wherein the fluid flow is guided upstream of the measuring nozzle through a vacuum nozzle, the vacuum nozzle being configured to generate a vacuum in a vacuum space by a flow of the fluid medium through the vacuum nozzle;

measuring a measurement pressure in the vacuum space; and determining a position of the workpiece or tool with respect to the support surface, taking into account the measurement pressure.

The method is preferably carried out such that the measurement pressure in the vacuum space reaches a negative value in the absence of a workpiece or tool on the support surface.

As already mentioned, the method can be carried out by means of a controller, wherein the controller receives a signal which is influenced by the measurement pressure, and wherein the controller determines the position of the workpiece or tool taking into account the received signal. The controller can optionally also determine a feed pressure upstream of the vacuum nozzle and determine the position of the workpiece or tool taking into account the feed pressure as well.

The signal which is influenced by the measurement pressure can advantageously be transmitted in a wireless manner to the controller. This is also true for the signal for the feed pressure. In particular, the respective signal can be transmitted by a passive RFID-transponder.

The method can furthermore comprise purging the vacuum nozzle and the measuring nozzle by means of a fluid which is introduced through an additional pressure port.

BRIEF DESCRIPTION OF THE DRAWINGS

Preferred embodiments of the invention are described in the following with reference to the drawings, which are only for the purpose of illustration and shall not be understood as limiting. In the drawings.

DESCRIPTION OF PREFERRED EMBODIMENTS

Figure 1:
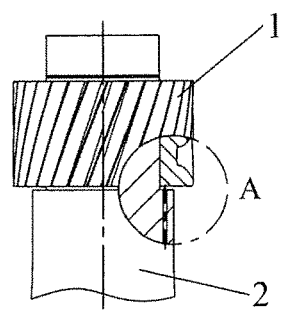
FIG. 1 shows a clamping device with a gear wheel clamped thereon, and with a device for monitoring contact in a front view; in cutout A, the clamping device and the gear wheel are shown in a central longitudinal section.

In the drawings, the same reference signs are used for the same or similar areas, pressures, functional elements or further elements.

Functional Principle

Figure 1A:
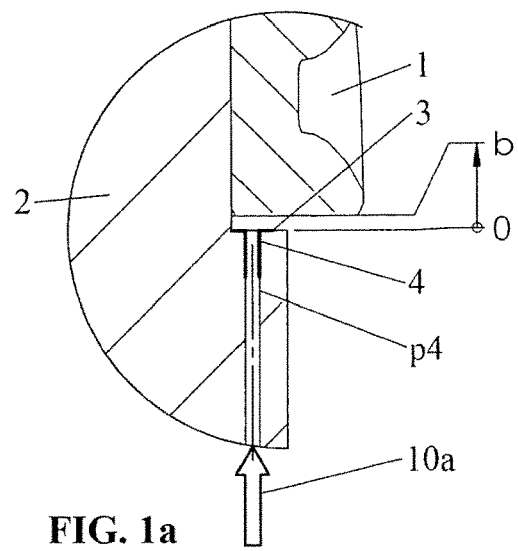
FIG. 1a shows an enlarged view of cutout A.

In FIGS. 1 and 1a, a workpiece 1 is shown in the form of a gear wheel, which has been placed on an automated workpiece clamping device 2. The gear wheel 1 comprises a planar front surface on its face that in FIG. 1 is arranged at the bottom. With this front surface, the gear wheel 1 rests upon a support surface 3 of the clamping device 2. The support surface 3 serves as a reference surface for the position of the workpiece 1. Between the support surface 3 and the front surface of the workpiece, a measurement slit b is formed. In the support surface 3, one or more, preferably three measuring nozzles 4 are formed. The measuring nozzles 4 are provided with pressurized air at a feed pressure $p1$ via a schematically shown pressure port 10a.

Figure 2:
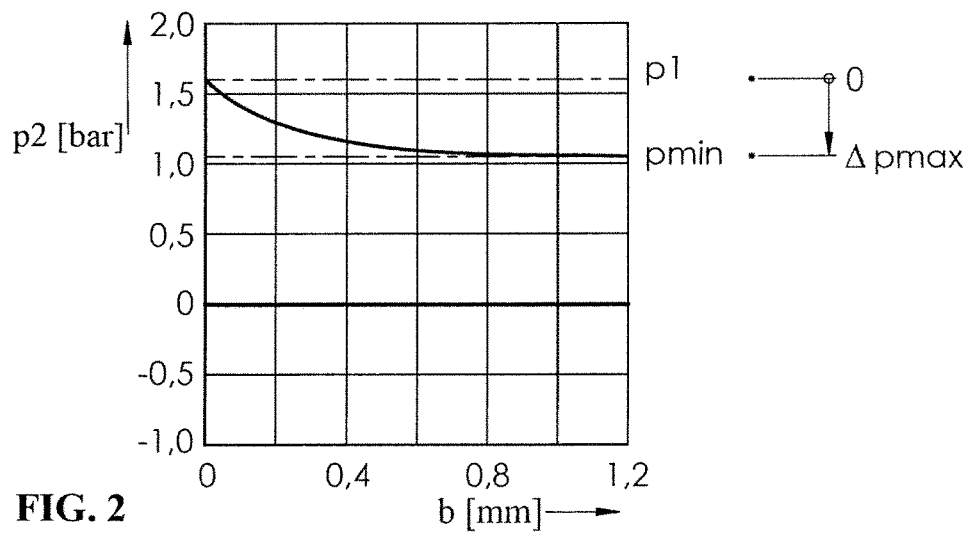
FIG. 2 shows an exemplary representation of the dependency of the measurement pressure on the measuring distance b in a device for monitoring contact according to the prior art.

For such a pneumatic arrangement, in the prior art, the dynamic pressure in the measuring nozzle, which is generated as a result of the workpiece preventing the discharge of the pressurized air from the measuring nozzle, is mostly directly or indirectly determined. FIG. 2 illustrates in an exemplary manner the dependency of the measurement pressure $p2$ in the measuring nozzle on the size of the measurement slit b. The measurement pressure is a function of the magnitude of the feed pressure and the measurement slit: $p2=f(p1, b)$. If the measurement slit is very large (in the present example e.g. $b>1$ mm), the discharge of the pressurized air from the measuring nozzle through the workpiece is not hindered in a noteworthy manner. The dynamic pressure caused by the workpiece is negligibly small, and the measurement pressure $p2$ in the measuring nozzle corresponds to a threshold value pmin. However, if the workpiece completely closes the measuring nozzle (b=0), the dynamic pressure reaches a maximum, and the measurement pressure $p2$ in the measuring nozzle corresponds to the feed pressure $p1$.

Instead of measuring the absolute pressure $p2$, the pressure difference $\Delta p = p1 - p2$ can also be measured, which thus also represents a function of the feed pressure $p1$ and the measurement slit b. The pressure difference $\Delta p$ reaches a maximum when the workpiece does not hinder the discharge of the pressurized air from the measuring nozzle: $\Delta pmax = p1 - pmin$. It becomes zero when the workpiece completely closes the measuring nozzle. The maximum pressure difference $\Delta pmax$ corresponds to the maximum pressure change due to the presence of the workpiece. It defines the size of the available measuring range. In the example of FIG. 2, the maximum pressure difference is $\Delta pmax \approx 0.5$ bar, at a feed pressure $p2=1.6$ bar.

In practice, it turns out that the maximum pressure difference $\Delta pmax$ often only slightly depends on the feed pressure. For instance, it turns out that e.g. at a feed pressure of $p1=0.8$ bar in the example of FIG. 2, the maximum pressure difference also is about 0.5 bar. Using the measuring principle according to the prior art, in the present example the size of the measuring range always is about 0.5 bar, substantially independent of the magnitude of the feed pressure.

If this measuring range shall be enlarged, this can only be achieved with a massively higher feed pressure and/or a higher flow rate. However, a higher feed pressure would result in smaller and lighter workpieces being pushed away, not achieving a secure abutment anymore. An increase of the flow rate is to be dismissed for economic reasons.

Figure 3:
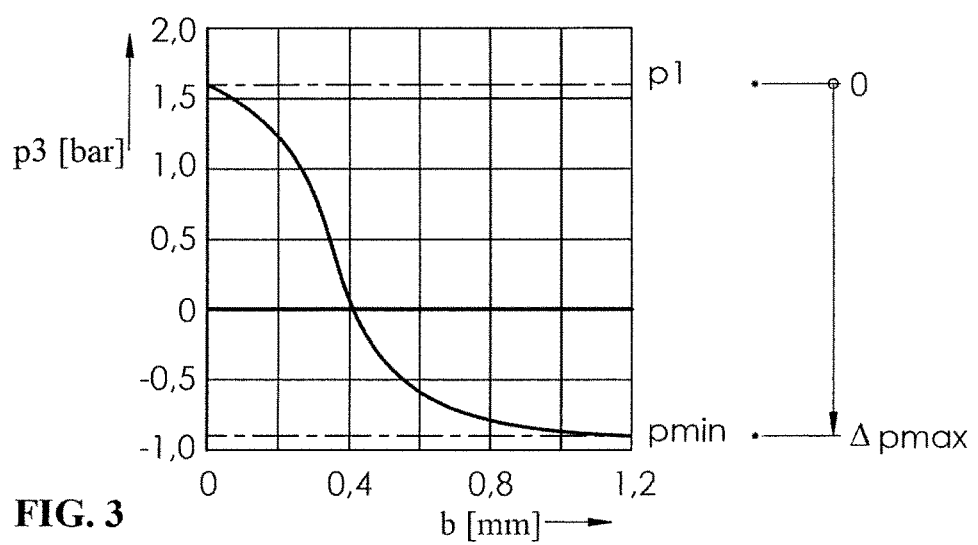
FIG. 3 shows an exemplary representation of the dependency of the measurement pressure on the measuring distance b in a device for monitoring contact according to the invention.

In contrast, in the present invention, an (absolute or relative) measurement of the pressure $p3$ takes place in the vacuum space of a vacuum nozzle. FIG. 3 illustrates in an exemplary manner a course of this pressure in dependency on the size of the measurement slit b. When the measurement slit is completely closed (b=0), no air flows through the vacuum nozzle. Accordingly, the pressure measured in the vacuum nozzle corresponds to the feed pressure $p1$. When the measurement slit is completely open (in the present example $b>1$ mm), the air can flow through the vacuum nozzle in an unhindered manner. Due to the Bernoulli principle, this results in a vacuum in the vacuum nozzle, which reaches at most a pressure minimum of $pmin \approx -0.9$ bar in the present example. The maximum pressure difference $\Delta pmax$ in this example is $\Delta pmax = p1 - pmin \approx 1.6$ bar $- (-0.9$ bar$) = 2.5$ bar. The magnitude of the measuring range, being about 2.5 bar, thus is about five times as large as for the measuring principle according to the prior art. The measuring range however is now strongly dependent on the feed pressure $p1$. It is larger, the larger the feed pressure is. Thus, a precise monitoring or at least determination of the feed pressure is especially important here.

Specific Embodiments

In FIGS. 4-7 four different embodiments of a device for monitoring contact according to the invention are shown in a strongly schematized and symbolic form by the way of example.

Figure 4:
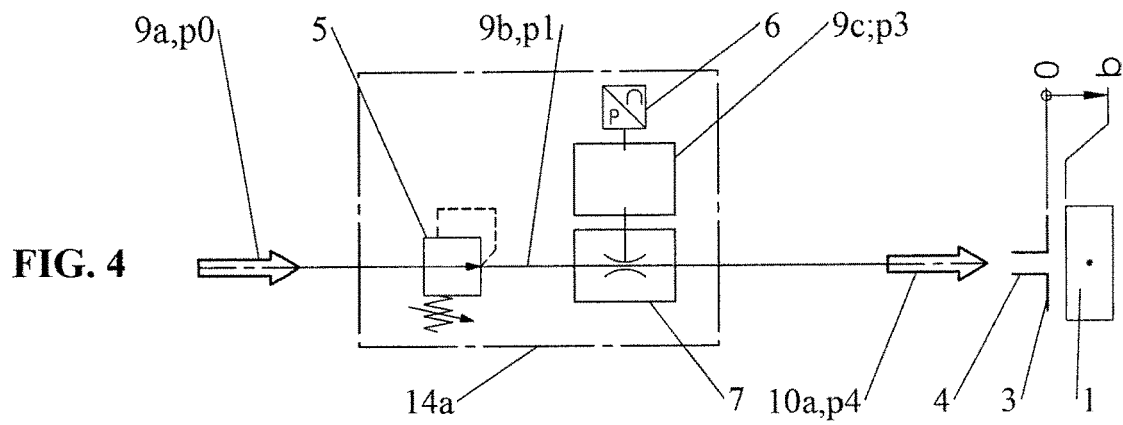
FIG. 4 shows a symbolic representation of a device for monitoring contact according to a first embodiment of the invention.

In the first embodiment of FIG. 4, a pressure port 9a with an operating pressure p0 is connected to a pressure regulator 5. The pressure regulator 5 provides a defined feed pressure $p1$, wherein the feed pressure preferably is in the range of 0.8 to 1.6 bar. Via a pressure line 9b the pressurized air is fed with feed pressure $p1$ to a vacuum nozzle 7. The vacuum nozzle communicates with a vacuum space 9c (only symbolically illustrated in FIG. 4), which is connected to a pressure sensor 6. The pressure sensor 6 can be an absolute or differential pressure sensor. In case of a differential pressure sensor, it can in particular measure the pressure difference between the feed pressure $p1$ and the pressure $p3$ in the vacuum space 9c. Via a measuring line 10a, the pressurized air discharged from the vacuum nozzle 7 reaches at least one measuring nozzle 4, preferably three measuring nozzles 4 equally distributed along the circumferential direction on the annular support surface 3 of the clamping device 2.

Pressurized air flows through each measuring nozzle 4 at a discharge pressure p4. The flow rate and the discharge pressure p4 are dependent on the position of the workpiece 1 with respect to the support surface 3, specifically on the size of the measurement slit b. In the vacuum nozzle, a vacuum develops through the flow of pressurized air, as described above, wherein the amount of vacuum in the vacuum nozzle is strongly dependent on the size of the measurement slit b. By determining the pressure in the vacuum space 9c using a pressure sensor 6, the flow rate discharged at the measuring nozzle and thus the size of the measurement slit b can be indirectly determined via the measurement of the pressure p3 in the vacuum nozzle. The maximum vacuum therein indicates that no workpiece is present in the measuring distance to the support surface. However, if the workpiece 1 completely closes the measuring nozzle 4, no pressurized air can flow anymore. In that case, p3=p4=p1, i.e. the measurement pressure p3 corresponds to the feed pressure p1, and also the discharge pressure p4 corresponds to the feed pressure. For the determination of the abutment of the workpiece 1 a positive pressure value close to p1 can be set as a switching point.

All single elements 5, 6, 7, 9b and 9c shown in FIG. 4 can be assembled as a common functional unit 14a and used on a fixed base part of a rotating spindle. The measuring nozzles 4 however are located on a rotatable part of the spindle. The pressurized air is then guided to the respective measuring nozzle 4 via a measuring line 10a and a commercially available rotary joint not illustrated.

Figure 5:
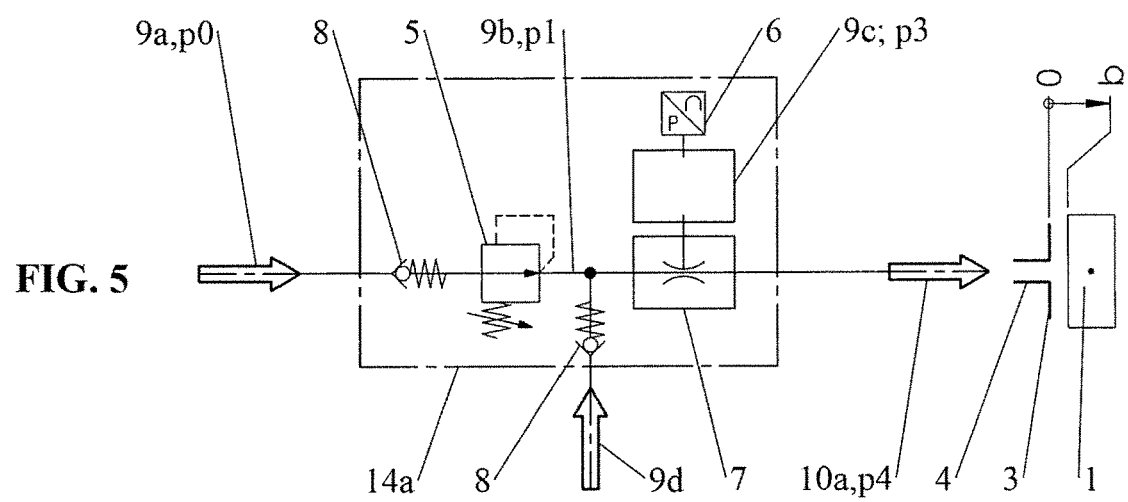
FIG. 5 shows a symbolic representation of a device for monitoring contact according to a second embodiment of the invention.

In FIG. 5, a second embodiment of a device for monitoring contact according to the invention is illustrated. This embodiment differs from the first embodiment in that it realizes a purging function with the aid of an additional pressure port 9d. For the purging of the entire functional unit 14a, pressurized air is introduced from the additional pressure port 9d to the inlet of the vacuum nozzle 7, at a higher pressure than the feed pressure, in particular with the full operating pressure p0 that is applied on the inlet of the pressure regulator. The pressurized air flows through the vacuum nozzle 7, the measuring line 10a, and the measuring nozzle 4, in order to clean these components. Non-return valves 8 prevent that during the purging the pressurized air introduced by the additional pressure port 9d is discharged through the normal pressure port 9a, and that during the normal measuring operation the pressurized air introduced by the normal pressure port 9a is discharged through the additional pressure port 9d.

Figure 6:
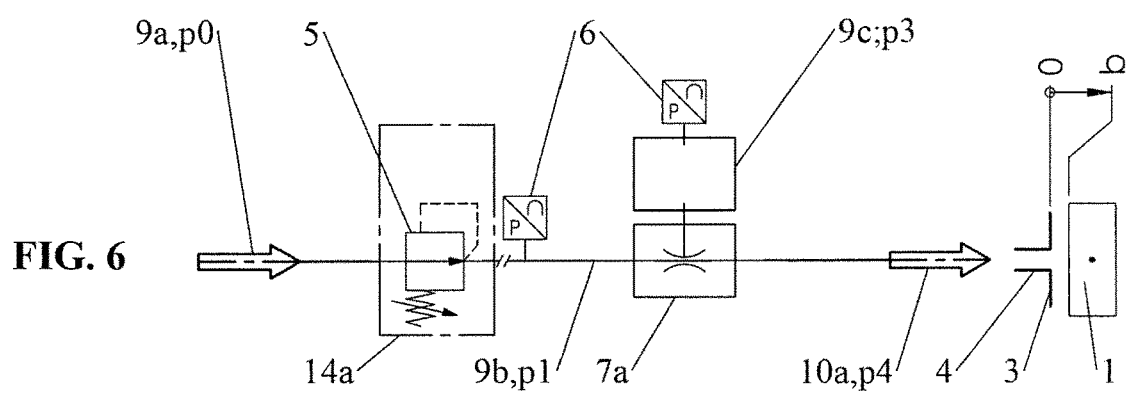
FIG. 6 shows a symbolic representation of a device for monitoring contact according to a third embodiment of the invention.

A third embodiment of a device for monitoring contact according to the invention is illustrated in FIG. 6. The vacuum nozzle is embodied in a pre-fabricated vacuum nozzle cartridge 7a. The vacuum nozzle cartridge 7a and the corresponding pressure sensors 6 are now arranged on the rotating spindle outside of the functional unit 14a. The reduced functional unit 14a with pressure regulator 5 however remains on the fixed base part and provides the calibrated pressurized air with a feed pressure p1 over a rotary joint to the rotating spindle. From there, the pressurized air reaches the vacuum nozzle cartridge 7a and further reaches the at least one measuring nozzle 4. Due to the larger distance of the pressure regulator 5 to the vacuum nozzle cartridge 7a, a second pressure sensor 6 is provided just upstream of it for the purpose of a precise measurement of the feed pressure p1. Of course, this embodiment can optionally also be provided with a purging function according to FIG. 5.

Figure 7:
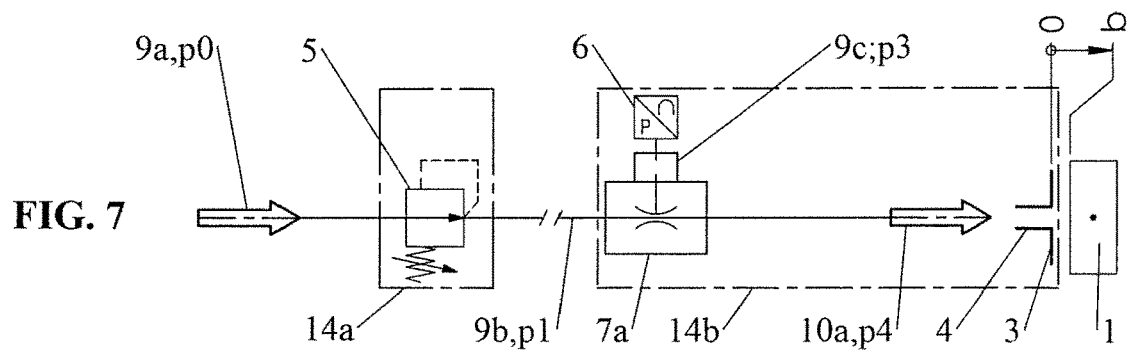
FIG. 7 shows a symbolic representation of a device for monitoring contact according to a fourth embodiment of the invention.

In FIG. 7, a fourth embodiment of a device for monitoring contact according to the invention is illustrated. Besides the reduced functional unit 14a on the fixed base part, a second, small and compact functional unit 14b is arranged on the rotating spindle. This functional unit 14b is arranged immediately upstream of the at least one measuring nozzle 4 and connected to each measuring nozzle via a short measuring line 10a. The vacuum nozzle can be realized in micro-design or again as a pre-formed vacuum nozzle cartridge 7a. The vacuum space 9c is connected via an air-tight connection line, e.g. a short bore, with a remote pressure sensor 6. A very compact sensor can be used as a pressure sensor 6. Modern pressure sensors which are connected in a wireless manner with a controller are advantageously suitable for this purpose. The pressure regulator 5, which requires more space, and the pressure port 9a for the operating pressure p0 however are arranged in an installation space on the fixed base part of the rotating spindle, which is less cramped. The calibrated pressurized air p1 is then provided by the pressure regulator 5 to the functional unit 14b via a commercially available rotary joint, which is not shown. An advantage of this embodiment is that the distances between the vacuum nozzle and the measuring nozzle 4 on the one hand and between the vacuum space 9c of the vacuum nozzle and the corresponding pressure sensor on the other hand can be realized in a very short manner. Thereby, a very short measuring time is made possible.

Further options for all embodiments according to FIGS. 4 to 7 can have certain restrictions:

- Instead of a pressure sensor 6, a pressure switch can also be used, which does not have to be evaluated electronically and is more cost-effective.
- A preceding pressure regulator valve 5 can be dispensed with if the pressure p1 is measured upstream of the vacuum nozzle 7 and is accordingly taken into account in the evaluation. In particular, instead of a pressure regulator 5, also a proportional pressure reducing valve or an adjustable or fixed pressure reducing valve can be used.

Embodiment of a Functional Unit

Figure 8:
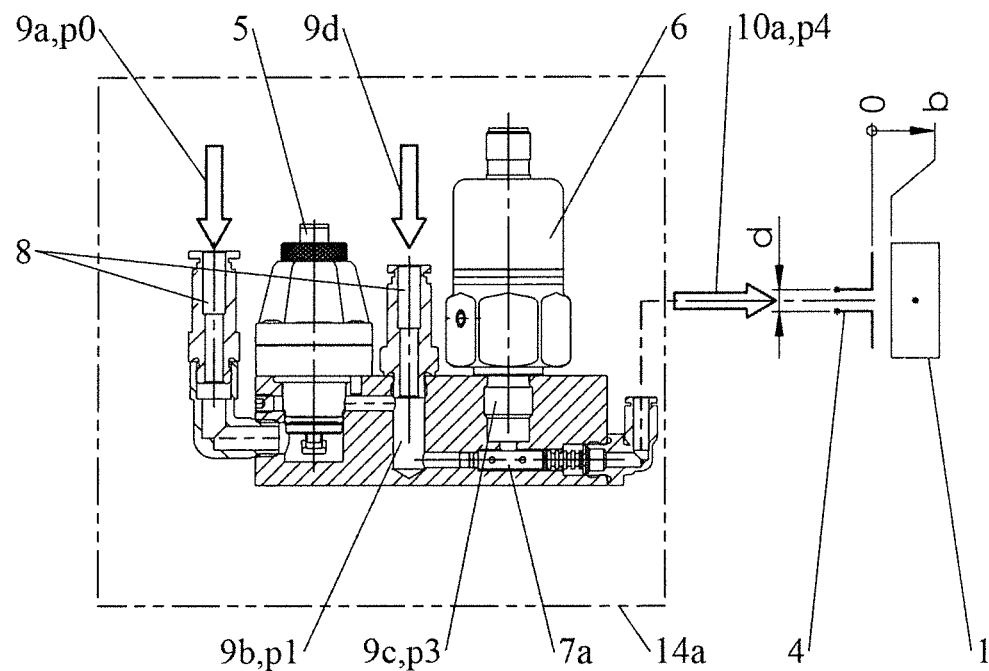
FIG. 8 shows a central longitudinal section through a device for monitoring contact according to the invention, which operates according to the principle of FIG. 5.

FIG. 8 shows a complete functional unit 14a in an embodiment according to FIG. 5. This embodiment can be assembled using commercially available elements and can also be used cost-efficiently as a standard in various applications.

The pressure regulator 5 is formed on a base body. The pressure line 9b is realized in the form of bores in the base body. The vacuum nozzle is formed as a pre-formed vacuum nozzle cartridge 7a, this cartridge being inserted into a corresponding bore of the base body against the direction of flow. The vacuum space 9c is formed as a bore running perpendicular to the direction of flow in the base body, this bore connecting to a vacuum port of the vacuum nozzle cartridge 7a. The pressure sensor 6 is connected to this bore. The non-return valves 8 are screwed into the base body. The pressure ports 9a, 9d are formed on the non-return valves 8.

Use on a Gear Processing Machine

Figure 9:
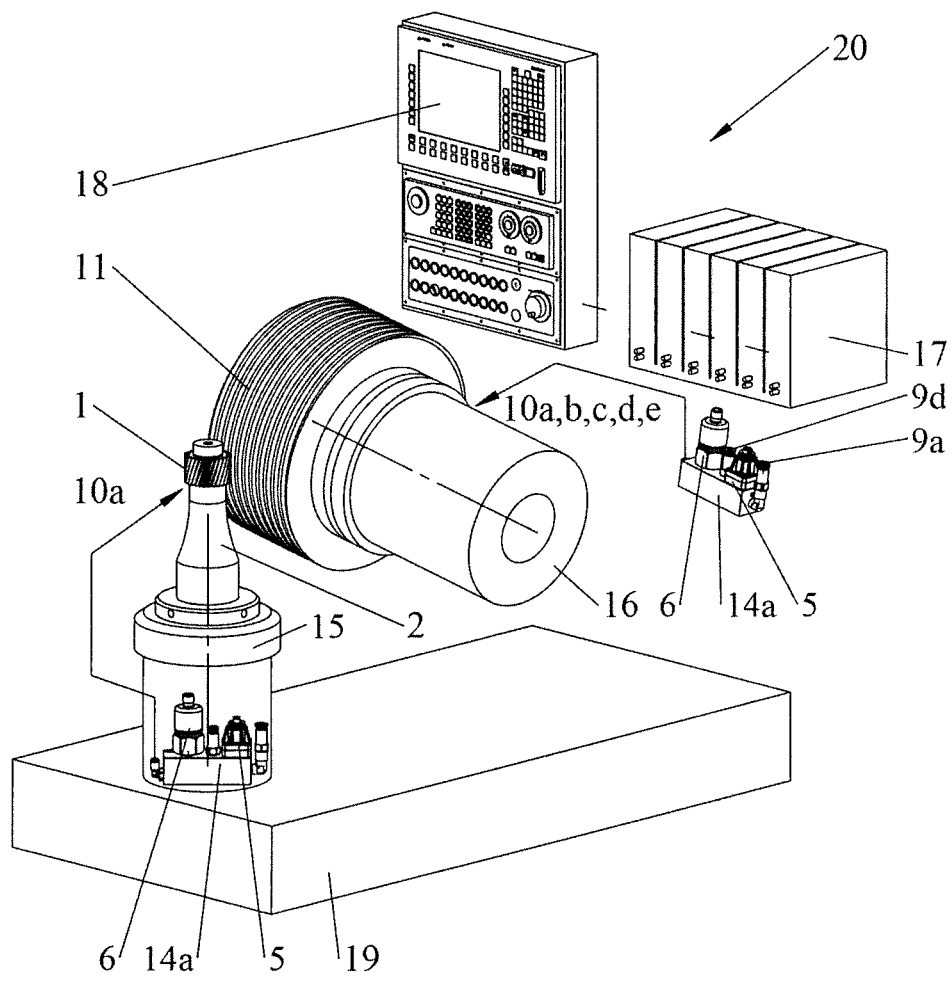
FIG. 9 shows a schematic representation with devices for monitoring contact according to the invention for a workpiece and a tool on a gear processing machine.

In FIG. 9, the use of devices for monitoring contact according to the invention are illustrated in a schematic and exemplary manner on a gear processing machine 20. On a machine bed 19, a workpiece spindle 15 is arranged. On a machine stand, which is not illustrated, a tool spindle 16 is arranged. In each case, a functional unit 14a according to FIG. 8 is assigned to the workpiece spindle and the tool spindle. The functional units serve to determine the presence of a workpiece 1 on the workpiece spindle or of a tool 11 on the tool spindle, respectively. The different functions of the machine are controlled via a machine controller 17. A control panel 18 serves for operating the gear processing machine.

Calibration

When processing different workpiece batches, the discharge conditions between the workpieces 1 and the clamping means 2 can vary. Therefore, it can be necessary to carry out a separate calibration for each combination of tool type and clamping means. In this context, it can make sense to determine an allowable tolerance range of the measurement, as the workpieces themselves usually have tolerances, e.g. different roughness grades of the front surfaces and tolerances of shape and position.

In the following, a possible calibration process is described. For this purpose typically the pressure p1 is determined first, for example by entering a defined value such as p1=1.6 bar on the control panel 18. By means of the CNC controller 17, this value can automatically be set on the pressure regulator 5. The measurement of a first measured value p3 on the pressure sensor 6 is carried out by fixing a workpiece 1 on the clamping device 2, this workpiece 1 abutting completely on the reference surface 3 of this clamping device 2. The electric output signal of the pressure sensor 6 is transmitted to the CNC controller 17, is stored there and if necessary manually acknowledged on the control panel 18. This measured value p3 is in this case equal or close to the pressure p1. The determination of a second measured value p3 on the pressure sensor 6 is carried out by placing a suitable distance gauge 12 between the reference surface 3 of the clamping device 2 and the parallel support surface on the workpiece 1, the height of said distance gauge corresponding to the maximum allowable measuring distance b. This second electric output signal of the pressure sensor 6 is also transmitted to the CNC controller 17 and treated there analogously to the first measured value p3. The user can also read this pressure p3, which in this case now typically lies in the vacuum range, directly from the control panel 18.

Further Considerations Concerning the Measuring Operation

In the following, several further considerations concerning the measuring operation are summarized. All measures described in the following can be implemented separately or together.

During the measuring operation, the electrical output signals of each pressure regulator 5 and of the pressure sensor 6 can be evaluated by the CNC-controller 17 according to prescribed rules and can be changed via the control panel 18. Preferably, by the use of a multi-touch monitor on the control panel 18, an interactive presentation of the pressure values p1 and p3 is facilitated, wherein these pressures can be illustrated visually analogously to the diagram shown in FIG. 3. The user can assign to each second or further measured value an individually defined tolerance, if necessary, via the multi-touch monitor, i.e. he can assess these measured values in relation to field-tested data and/or can assign limit values and offsets to these measured values. If necessary, a fixed value or limit value, respectively, can be given an assigned tolerance, an allowable measuring range can be assigned or a switching point can be defined. These settings can then become effective via the CNC controller 17 without any manual intervention of the user. The accessibility of the functional units 14a must therefore only be ensured in case of maintenance work.

Via the CNC controller 17, the possibility further exits to record the measured value data of individual workpieces 1 and to assign them to the corresponding workpiece batches. For a recurring workpiece 1, the measured values concerning the measuring distance b can be deposited in the CNC controller 17 as a set of parameters. If the same workpiece is manufactured again, these sets of parameters can be retrieved and used for this purpose. This becomes possible by means of data logging and/or storing of reference sets of parameters. If a further workpiece 1 of the same batch is placed onto the reference surface 3, a comparison of the current measured value p3 with the stored tolerance range of the measuring distance b is automatically carried out. Thereby, comparative values can easily be retrieved and used in case of a known combination of clamping means 2 and workpiece 1. If the measured value lies outside of the admissible tolerance, the deviation can be indicated on the control panel 18 and/or the CNC controller 17 can initiate corresponding correcting measures. Furthermore, a surveillance of inadmissible deviations of the pressures p1 and p3 is carried out, as well as of the determined measuring distance b. Thereby, this method provides an important contribution for the collection of process data, traceability and reproducibility of the manufacturing process as well as for ensuring the process safety.

By this especially good integrative ability into the present CNC controller 17 with the control panel 18, further special functions can be offered, such as regulation of pressurized air, shut off of measuring air, magnification of the electric measuring signals, controller functions with visualization and not least the realization of an effective purging function.

Altogether, thus a fast, compact and highly precise embodiment of a device for monitoring contact on rotating spindles 15, 16 can be realized.

Further Functions: Measurement of Distance, Measurement of Dynamic Pressure, Measurement of Flow, Regulation of Flow, Regulation of Pressure With a device as previously described, further functions can be realized without major changes. In particular, such a device can be used for measurements of smallest distances, of dynamic pressures or of flow rates and for the regulation of flow rate or of pressure.

For instance, during operation of a grinding spindle 16, thermal changes occur, which lead to small changes in length of this spindle 16 and then can cause errors on the workpiece 1 during processing. These small changes in length with respect to a fixed base part on the grinding spindle 16 can be detected by a pneumatic measurement of distance by means of a device as described above and corrected via the controller 17.

In these measuring methods, for the purpose of calibration, preferably the entire measuring distance b is scanned in a teach process, wherein besides the calibrated pressure p1 the measurement pressure p3 is transmitted to the controller 17 at least at five predefined distance steps and assigned to the relevant measuring distances b. For this purpose, during the startup of the gear processing machine 20 or during the replacement of the workpiece and clamping means, respectively, distance gauges 12 with correspondingly stepped height between workpiece 1 and reference surface 3 are inserted on the clamping device 2. The non-linear pressure curve p3 is linearized for an improved usability and a more precise setting of the pressure values by means of the controller 17.

Based on the measuring curve and the present measurement pressure p3, the controller 17 calculates the respective measuring distances b, the respective dynamic pressures and the respective flow rates and transmits them if necessary to the control panel 18. Furthermore, for each functional unit 14a a measuring curve analogous to FIG. 3 can be visually illustrated on the control panel 18 and stored in the controller 17 for comparative purposes. The scanning of the entire measuring distance b, the linearization and the calculative determination of the various data are preferably realized for all embodiments and applications.

On gear processing machines 20, often optical measuring devices are used, which usually are operated with oil-free sealing air. The necessary amounts of air per measuring device typically are 7 to 10 l/min and are operated with a feed pressure of typically 1 bar. Thus, for example in gear processing machines with optical measuring devices, permanently about 80 l/min oil-free sealing air must be provided for 8 NC-axes. The permanent provision of this amount of air results in a non-negligible cost factor. Therefore, it is desirable to only provide exactly the necessary amount of sealing air. A device of the abovementioned kind can serve for the purpose of flow regulation.

Sealing air is also needed for the secure sealing of fast rotating workpiece and tool-spindles. However, for this purpose also oil-containing air can be used. Pressure and amount of air are adjusted according to the spindle size. Here too, ideally this sealing air is also only to be provided in the exactly necessary amount. In this case too a device of the above mentioned kind can serve for the regulation of flow.

When using such a device for flow regulation, a constant amount of pressurized air is guaranteed by regulating the pressure p3 on the pressure sensor 6 by a proportional pressure reducing valve, which is arranged upstream of the vacuum nozzle. Thereby, the pressure p1 is regulated such that on the pressure sensor 6 always a constant pressure p3 is detected, which is proportional to the desired flow rate. The regulation can be carried out by the controller 17.

The various possibilities of use of the device are schematically shown in FIG. 9 by measuring lines 10a, b, c, d, e, wherein the measuring line 10a shall illustrate a device for monitoring contact, the measuring line 10b any measurement of distance, the measuring line 10c any measurement of dynamic pressure, the measuring line 10d any measurement of flow and the measuring line 10e any regulation of flow.

Embodiments in Micro Design

Figure 10:
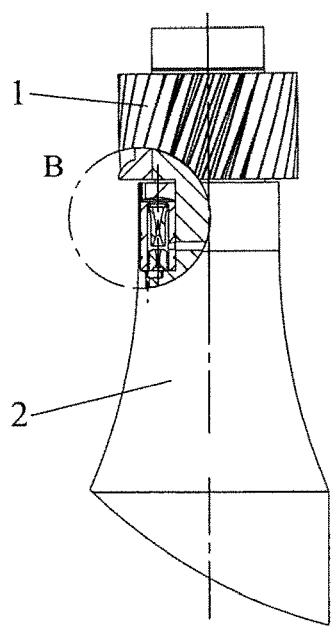
FIG. 10 shows a detailed view of a workpiece spindle with a cutout B.
Figure 10A:
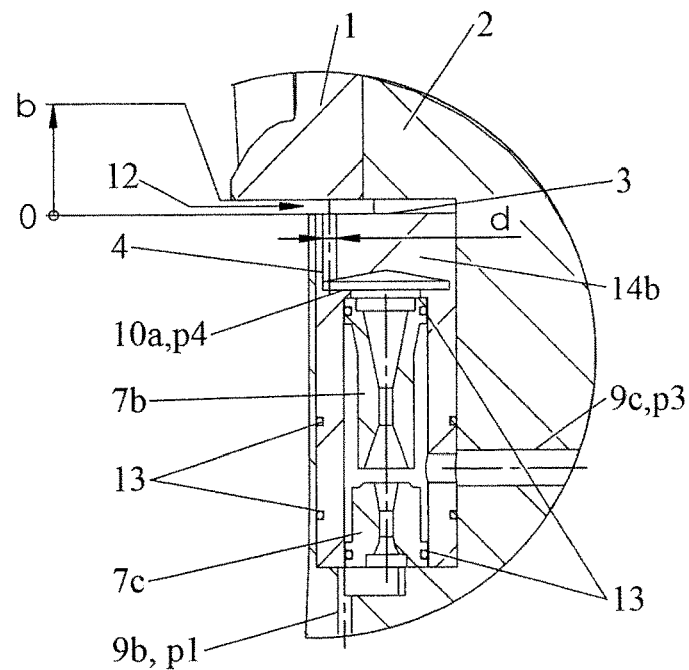
FIG. 10a shows an enlarged detail view of the cutout B in FIG. 10.

FIGS. 10 and 10a illustrate the realization of a device for monitoring contact in a micro design according to FIG. 7. A micro-functional unit 14b is arranged in the rotating region of a workpiece spindle in a clamping means 2. The micro-functional unit 14b is formed as a vacuum nozzle cartridge. It comprises two nozzle elements in the form of a jet nozzle 7c and a collector nozzle 7b. A pressure regulator 5, which is not illustrated, is fastened to a fixed base part of the workpiece spindle 15. Pressurized air with pressure p1 is provided from there via a rotary joint, which is not illustrated, to the pressure port 9b, and continues from there to the jet nozzle 7c. The jet nozzle comprises a continuous taper which strongly accelerates the entering pressurized air. The jet nozzle opens up into a chamber, which is connected to a vacuum space 9c in the form of a bore in the clamping means 2. On the vacuum space 9c, a pressure sensor, which is not illustrated, is arranged. The gas discharged from the jet nozzle 7c reaches the collector nozzle 7b at a high velocity. Therein, the gas is guided through a further continuous taper into a slowly expanding discharge region, whereby the gas flow is decelerated again. The gas continues from there into a measuring nozzle 4 with a diameter d. The jet nozzle 7c and the collector nozzle 7b are received in a common housing of the micro functional unit 14b. The entire micro functional unit 14b is held gas-tight via further seals 13 in a bore of the clamping means 2 of the workpiece spindle.

For the calibration of the device for monitoring contact, distance gauges 12 with various thicknesses can be used in order to obtain a measurement slit with a defined size b.

Figure 11:
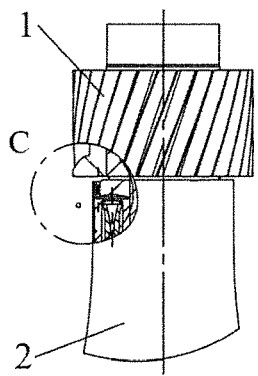
FIG. 11 shows a detailed view of a workpiece spindle with a cutout C.
Figure 11A:
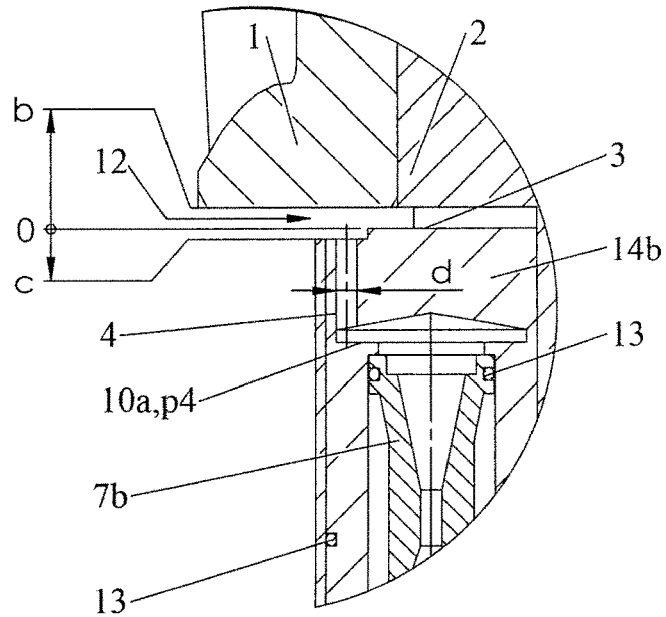
FIG. 11a shows an enlarged detail view of the cutout C in FIG. 11.

In FIGS. 11 and 11a, optionally the measuring nozzle 4 is set back with respect to the reference surface 3 by the amount c. In this embodiment, the abutment of the workpiece 1 is detected when an exactly defined flow rate flows through the functional unit 14b.

Figure 12:
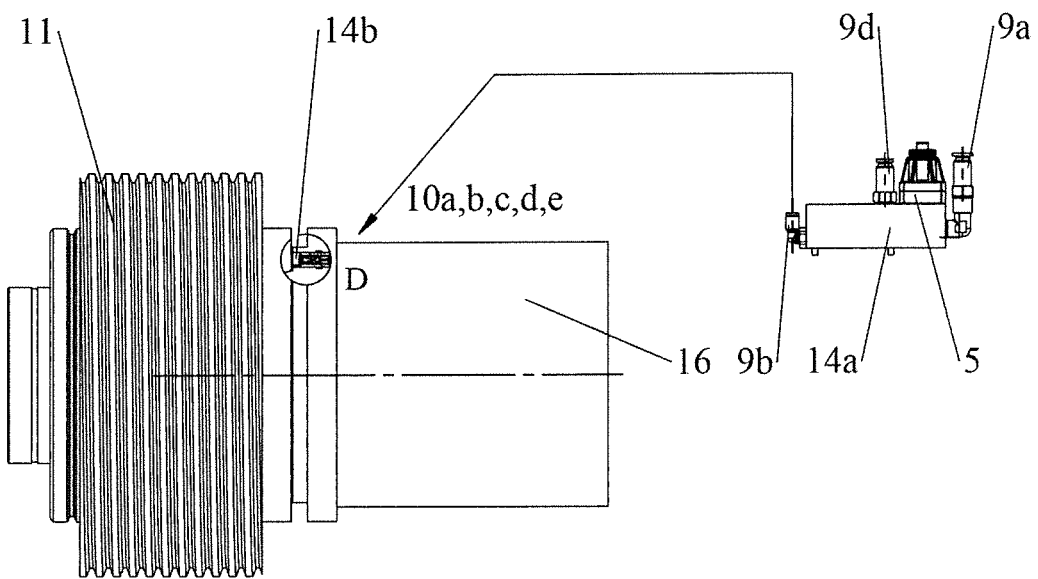
FIG. 12 shows a detailed view of a grinding spindle with a cutout D.
Figure 12A:
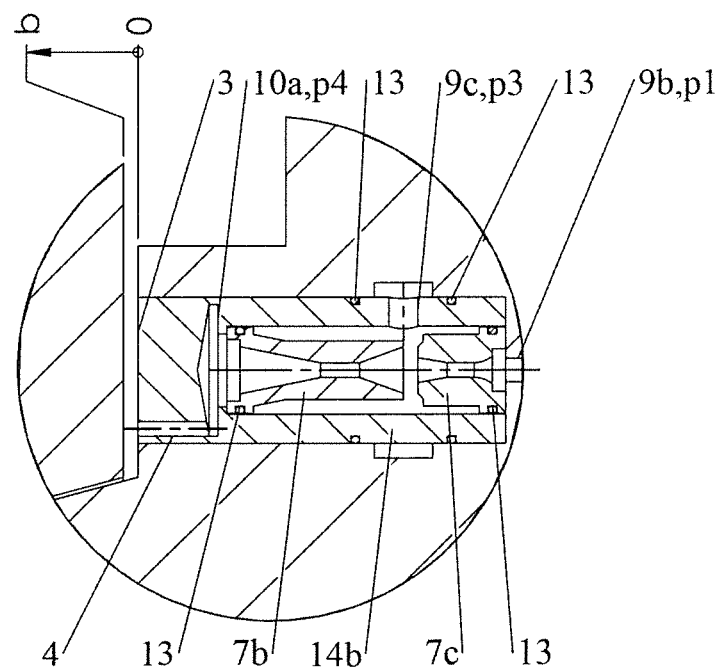
FIG. 12a shows an enlarged detail view of the cutout D in FIG. 12.

FIGS. 12 and 12a illustrate the use of a device for monitoring contact according to the invention on a tool spindle 16. On the tool spindle, a rotating processing tool, here in the form of a rotating grinding disc 11, is clamped. Monitoring of contact for the grinding disc 11 is carried out analogously to the monitoring of contact for the workpiece 1 in the embodiments of FIGS. 10, 10a, 11 and 11a. Reference is made to the corresponding description above.

Again, further possibilities of use are illustrated by measuring lines 10a, b, c, d, e with different tasks. For the different kinds of measurements indicated hereby, reference is made to the above description with respect to FIG. 9.

Considerations Concerning the Pressure Sensor and the Signal Transmission

For the pressure sensors 6, which are not illustrated, in all embodiments small sensors can be used, which e.g. can be connected in a wireless manner to the CNC controller 17. Therein, the wireless signal transmission can be carried out e.g. by means of the known Near Field Communication (abbreviated as NFC) or the RFID technique, respectively. If a (preferably passive) RFID pressure transponder is used for wireless pressure determination, it can for example be connected in the metallic spindle 15 via a secure signal transmission by means of RFID technique to the CNC controller 17. A corresponding signal transmission concept is extensively described in WO 2015/036519 A1, the disclosure of which is incorporated herein by reference in its entirety. With this embodiment, a very attractively priced solution for smallest tolerances can be provided.

Advantages

In summary, the illustrated embodiments have in particular the following features and advantages, wherein these features and advantages can be realized separately or in combination:

- The measuring range is substantially larger with respect to the prior art due to the pneumatic signal enhancement.
- Pneumatic monitoring of contact and measurement of distance is resistant to soiling, works fast, securely detects a measurement slit of less than 0.01 mm, has a very high repeatability and recognizes the secure abutment of a workpiece.
- The device can be realized in standard design (as in the functional unit 14a) or in micro design (as in functional unit 14b).
- Besides the monitoring of contact of workpieces, the illustrated device can also be used in further applications, such as measurements of distance, measurements of dynamic pressure and flow rate, as well as regulation of pressures and flow rates.
- Instead of pressurized air, another gas or a liquid can also be used as a fluid.

The invention claimed is:

1. A device for monitoring contact of a workpiece or tool on a spindle of a machine tool using a fluid medium, the device comprising:

a support surface for the workpiece or the tool;
a vacuum nozzle having a fluid inlet, a fluid outlet, a constriction between the fluid inlet and the fluid outlet, and a vacuum space, such that a positive feed pressure at the inlet of the vacuum nozzle causes a fluid flow of the fluid medium through the vacuum nozzle from the fluid inlet to the fluid outlet, the fluid flow being accelerated by the constriction on its way to the fluid outlet, thereby affecting a measurement pressure in the vacuum space;
at least one measuring nozzle arranged downstream of the vacuum nozzle such that the fluid flow is guided through the at least one measuring nozzle after having been guided through the vacuum nozzle, the at least one measuring nozzle being arranged in a region of the support surface such that the fluid flow is directed away from the support surface when it exits the measuring nozzle; and
at least one first pressure sensor or pressure switch configured to detect the measurement pressure in the vacuum space,
wherein the device is configured such that the measurement pressure in the vacuum space has a negative value relative to ambient pressure when the measuring nozzle is completely open in the absence of a workpiece or tool on the support surface, whereas the measurement pressure in the vacuum space has a positive value relative to ambient pressure when the measuring nozzle is completely closed.

2. The device according to claim 1, wherein the first pressure sensor is configured to detect both positive and negative values of the measurement pressure in the vacuum space.

3. The device according to claim 1, comprising a pressure regulator for creating the feed pressure upstream of the vacuum nozzle at a predetermined feed pressure value.

4. The device according to claim 3, wherein the pressure regulator is configured to create the feed pressure in such a manner that the feed pressure has a feed pressure value of not more than 2 bar.

5. The device according to claim 1, comprising at least one second pressure sensor for determining the feed pressure upstream of the vacuum nozzle.

6. The device according to claim 1, comprising a controller, the controller being configured to receive a signal from the first pressure sensor or pressure switch, said signal depending on the measurement pressure, and to determine a position of the workpiece or tool, taking into account the received signal.

7. The device according to claim 6, wherein the controller is configured to take into account the feed pressure upstream of the vacuum nozzle for determining the position of the workpiece or tool.

8. The device according to claim 1, wherein the measuring nozzle is arranged in the region of the support surface in such a manner that a workpiece or tool completely closes the measuring nozzle in case of a precisely plane-parallel abutment of the workpiece or tool on the support surface.

9. The device according to claim 1, wherein the measuring nozzle is arranged in the region of the support surface in such a manner that a workpiece or tool is arranged at a defined distance from the measuring nozzle in case of a precisely plane-parallel abutment of the workpiece or tool on the support surface, such that the workpiece or tool does not completely close the measuring nozzle.

10. The device according to claim 1, wherein the vacuum nozzle and the measuring nozzle are arranged on a rotatable part of the spindle.

11. The device according to claim 1, wherein the vacuum nozzle comprises a jet nozzle and a collector nozzle arranged downstream of the jet nozzle, and wherein the vacuum space communicates with a region located between the jet nozzle and the collector nozzle.

12. The device according to claim 1, comprising a functional unit which comprises a housing in which at least the vacuum nozzle is arranged.

13. The device according to claim 12, wherein the functional unit further comprises the measuring nozzle.

14. The device according to claim 12, wherein the functional unit is arranged as a cartridge in a bore on a rotatable part of the spindle.

15. The device according to claim 1, wherein the first pressure sensor or pressure switch comprises a device for wireless signal transmission.

16. The device according to claim 15, wherein the device for wireless signal transmission is a passive RFID transponder.

17. The device according to claim 1, comprising an additional pressure port for purging at least the vacuum nozzle and the measuring nozzle.

18. The device according to claim 1, comprising at least one further vacuum nozzle, wherein the device is configured for one of the following tasks using the further vacuum nozzle:
measuring a distance between two machine elements;
measuring a dynamic pressure;
measuring a flow rate;
regulating the flow rate;
regulating a pressure.

19. The device according to claim 1, wherein the vacuum nozzle is a Laval nozzle.

20. The device according to claim 1, wherein the first pressure sensor is a differential pressure sensor configured to measure a pressure difference between the measurement pressure and the feed pressure.

21. A method for monitoring contact of a workpiece or tool on a spindle of a machine tool using a fluid medium, the spindle comprising a support surface for the workpiece or tool, the method comprising:
generating a positive feed pressure upstream of a vacuum nozzle having a fluid inlet, a fluid outlet, a constriction between the fluid inlet and the fluid outlet, and a vacuum space, such that the positive feed pressure causes a fluid flow of the fluid medium through the vacuum nozzle from the fluid inlet to the fluid outlet, the fluid flow being accelerated by the constriction on its way to the fluid outlet, thereby affecting a measurement pressure in the vacuum space; and
guiding the fluid flow through at least one measuring nozzle after the fluid flow has been guided through the vacuum nozzle, the at least one measuring nozzle being arranged downstream of the vacuum nozzle in a region of the support surface in such a manner that the fluid flow is directed away from the support surface when the fluid flow exits the at least one measuring nozzle;
detecting the measurement pressure in the vacuum space; and
determining the position of the workpiece or tool with respect to the support surface taking into account the measurement pressure,
wherein the measurement pressure has a negative value relative to ambient pressure when the measuring nozzle is completely open in the absence of a workpiece or tool on the support surface, whereas the measurement pressure has a positive value relative to ambient pressure when the measuring nozzle is completely closed.

22. The method according to claim 21, wherein the method is carried out by means of a controller, wherein the controller receives a signal that is influenced by the measurement pressure, and wherein the controller determines the position of the workpiece or tool taking into account the received signal.

23. The method according to claim 22, wherein the controller further determines the feed pressure upstream of the vacuum nozzle, and wherein the controller determines the position of the workpiece or tool taking into account the feed pressure.

24. The method according to claim 22, wherein the signal that is influenced by the measurement pressure is transmitted to the controller in a wireless manner.

25. The method according to claim 24, wherein the signal is transmitted by a passive RFID transponder.

26. The method according to claim 21, further comprising purging the vacuum nozzle and the measuring nozzle using an additional pressure port.

27. The method according to claim 21, wherein the fluid flow in the vacuum nozzle is accelerated to a supersonic velocity.

28. The method according to claim 21, wherein the measurement pressure in the vacuum space is determined using a differential pressure sensor that measures a pressure difference between the measurement pressure and the feed pressure.

* * * * *